United States Patent [19]

Ban et al.

[11] 4,447,751

[45] May 8, 1984

[54] DIRECT CURRENT MOTOR

[76] Inventors: Itsuki Ban, 829 Higashi-Oizumimachi, Nerima-ku, Tokyo; Manabu Shiraki, 4451-171 Shimotsuruma, Yamato-shi, Kanagawa-ken; Kazuhito Egami, 2-44-1 Chuo, Nakano-ku, Tokyo, all of Japan

[21] Appl. No.: 320,534

[22] Filed: Nov. 12, 1981

[51] Int. Cl.³ .............................................. H02K 21/26
[52] U.S. Cl. ..................................... 310/154; 310/268
[58] Field of Search ............... 310/154, 152, 206, 207, 310/268

[56] References Cited

U.S. PATENT DOCUMENTS

| | | | |
|---|---|---|---|
| 4,243,902 | 1/1981 | Ban | 310/268 X |
| 4,283,644 | 8/1981 | Kondo et al. | 310/268 X |
| 4,315,177 | 2/1982 | Ban | 310/154 |
| 4,315,178 | 2/1982 | Ban | 310/154 |
| 4,369,388 | 1/1983 | Ban | 310/154 |
| 4,390,805 | 6/1983 | Hahn | 310/159 |

*Primary Examiner*—Donovan F. Duggan
*Attorney, Agent, or Firm*—Kenway & Jenney

[57] ABSTRACT

A direct current motor comprises a field magnet having 2 mn magnetic poles magnetized with the same angular intervals as those of the magnetic poles N and S, where m is an integer of 1 or more, and n is an integer of 4 or more, a magnetic member for closing the magnetic circuit of the magnetic poles of the field magnet, an armature in which m(2n±n) armature coils are arranged each magnetically with a phase angle of 360/(2n±2) degrees, the armature being directed towards the magnetic poles in the magnetic circuit, electric power supply control means for performing the switching of an armature current mn(2n±2) times per revolution of the armature with respect to the field magnet, and a rotating shaft for rotatably supporting the armature or the field magnet, the rotating shaft being supported by a bearing disposed in an outer casing of the direct current motor. In arrangement in which the armature coils correspond to the magnetic poles, the terminal of an armature coil which has a closest relationship to its corresponding magnetic pole with respect to a relationship of any desired armature coil to its corresponding magnetic pole, and the terminal of that desired armature coil are connected together to the electric power supply control means so that the armature coils are wound in the same direction.

4 Claims, 21 Drawing Figures

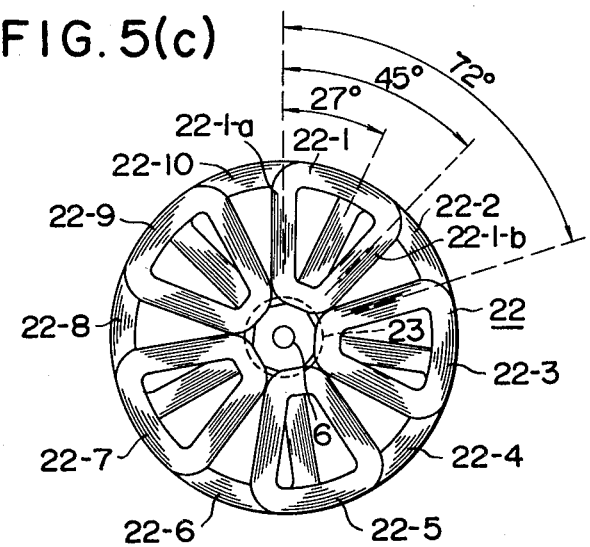
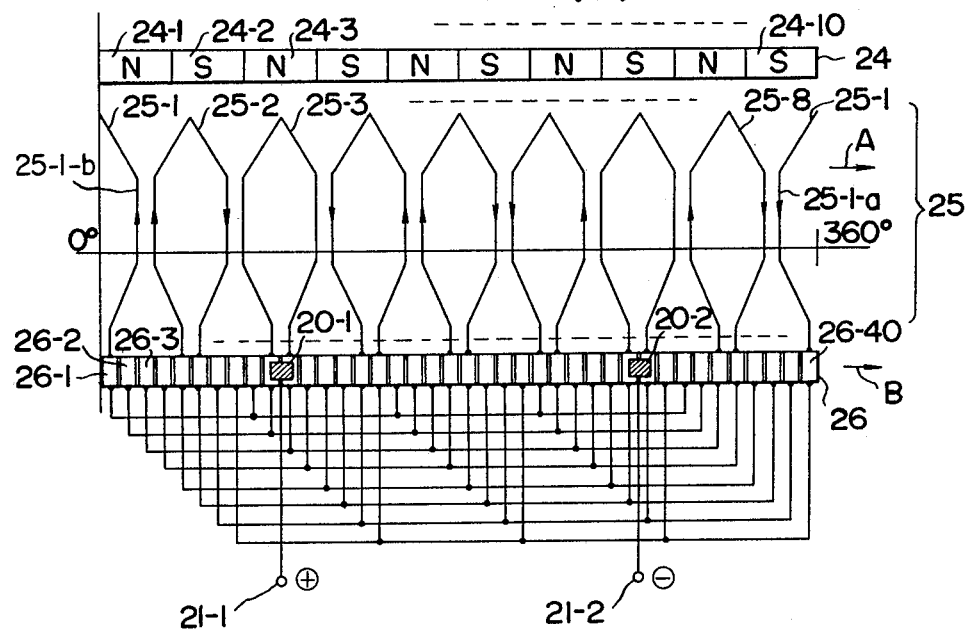

DIRECT CURRENT MOTOR

BACKGROUND OF THE INVENTION

The present invention relates to a direct current motor, and more particularly to such a direct current motor having a plurality of armature windings disposed around a disc-shaped or cylindrical coreless armature.

Conventionally, a number of motors of the type with an armature core having a plurality of armature windings formed in a lap winding or wave winding manner are widely used. However, when the conventional armature windings are employed in the coreless type motor, various shortcomings are encountered as will be explained by referring to FIG. 1. FIG. 1 is a developed view of known armature windings formed in a lap winding manner and employed in a coreless motor, the lap winding armature comprising twenty four armature coils, provided with a field magnet with eight magnetic poles. The field magnet 1 has magnetic poles 1-1, 1-2, . . . , 1-8, magnetized alternately to N and S with 45 degree angular intervals. A commutator 3 comprises commutator segments 3-1, 3-2, . . . , 3-24, with 15 degree angular intervals (⅓ the magnetic pole width), and every four commutator segments which are angularly spaced 90 degrees (2/1 the magnetic pole width) from each other are electrically connected to each other by conductors serving as short-circuitting members. More specifically, commutator segments 3-1, 3-7, 3-13, and 3-19, commutator segments 3-2, 3-8, 3-14, and 3-20, commutator segments 3-3, 3-9, 3-15, and 3-21, commutator segments 3-4, 3-10, 3-16, and 3-22, commutator segments 3-5, 3-11, 3-17, and 3-23, and commutator segments 3-6, 3-12, 3-18, and 3-24 are inter-connected or short-circuitted. An armature 2 is an open-connected normal lap winding, with the angular intervals of the conductors which contribute to the generation of torque in each armature coil being set equal to the magnetic pole width. Armature coils 2-1, 2-2, . . . , 2-24 are each disposed with an equal pitch of an angular interval of 15 degrees (⅓ the magnetic pole pitch), and are superimposed on each other. Each armature coil is subjected to lap winding connection. The connecting portions of the armature coils 2-1 and 2-2, the armature coils 2-2 and 2-3, the armature coils 2-3 and 2-4, . . . , the armature coils 2-23 and 2-24, and the armature coils 2-24 and 2-1 are connected respectively to the commutator segments 3-2, 3-3, 3-4, . . . , 3-24, 3-1. To brushes 4-1 and 4-2 is supplied power from D.C. power source positive and negative poles 5-1 and 5-2, respectively. The brushes 4-1 and 4-2 are slidable on the commutator segments are disposed with 135 degree angular intervals (3/1 the magnetic pole width), but may equivalently be disposed with either 45 degree angular intervals (the magnetic pole width), 225 degree angular intervals (5/1 the magnetic pole width), or 315 degree angular intervals (7/1 the magnetic pole width). It is apparent that use of brushes 4-1, 4-2, . . . , 4-8 as shown by the broken lines dispenses with short-circuitting of the commutator segments. More specifically, the brushes 4-1, 4-3, 4-5, and 4-7 are supplied with an electric current from the D.C. power source positive terminal 5-1, and the brushes 4-2, 4-4, 4-6, and 4-8 are supplied with an electric current from the D.C. power source negative terminal 5-2, the brushes being angularly spaced 45 degrees (the magnetic pole width). In the configuration as shown, an electric current flows in the direction of the arrowheads, and torque is generated in each armature coil, so that the armature 2 and the commutator 3 are respectively rotated in the directions of the arrows A and B, and work as a commutator motor. With such a motor, the armature coils are superimposed in multiple layers, resulting in an increased thickness of the armature. Such an increased thickness weakens an effective magnetic field passing through the armature, thus reducing the efficiency and starting torque of the motor. In order to eliminate those shortcomings, a prior art effort has been directed to decreasing the thickness of the conductor portions contributing to the generation of torque. However, this process for decreasing the thickness of the conductor portions is performed by press molding, and accordingly is often accompanied by such defects as breaking and short-circuitting of the armature coils. Further, since the phase relationship between the armature coils cannot be positively held in the desired state at the time the coils are arranged, a correct phase relationship between the windings is liable to be distorted, and hence a highly efficient direct current motor has been difficult to fabricate. Accordingly, prior art DC motors are costly and cannot be mass-produced.

The foregoing shortcomings could be overcome by reducing the number of armature coils. Such a proposal however would be disadvantageous in that with a smaller number of armature coils, the number of switchings of an armature current per revolution of the armature relatively to the magnetic poles would be reduced, resulting in poor commutating characteristics. As a result, reverse torque is generated and the operation efficiency and starting torque would be reduced. Furthermore, since the number of armature coils present between the positive and negative terminals of the D.C. power supply is extremely small, the arrangement could not be used as a direct current motor for use with a high voltage. Sparking would frequently take place and short-circuitting troubles would be apt to occur. The motor would therefore be rendered less durable.

In conventional coreless motors with cylindrical armatures, insulated wires are one by one wound, by way of alignment winding, fully or partly obliquely with respect to the winding width, alternately folded over at both ends substantially through every 180 degrees, and successively coiled to provide the cylindrical armature without the wire ends being superimposed on each other in the winding width. These prior coreless motors, however, cannot be mass-produced and hence expensive to produce.

SUMMARY OF THE INVENTION

The above-described drawbacks in the prior art apparatus have been successfully eliminated by the present invention.

Accordingly, it is an object of the present invention to provide a direct current motor which has a thin armature, is of a simple construction, can be mass-produced inexpensively, and is characterized by a high torque, a high efficiency, and good commutating charateristics.

The above object can be achieved by a DC motor having a field magnet including 2 mn magnetic poles (where m is an integer of 1 or more and n is an integer of 4 or more), m(2n±2) armature coils, and an electric power supply control device for performing the switching of an armature current mn(2n±2) times per revolution of the armature relative to the magnetic poles (with commutator motors, the number of switchings is obtained where the brushes are angularly spaced by an extremely small angle, and does not agree with the embodiment illustrated. The number of switchings is counted except a singular point where the brush is held in sliding contact with two commutator segments and where switching takes place. This holds true for embodiments described later on).

These and other objects of the invention will become apparent from the following description of embodiments thereof when taken together with the drawings.

BRIEF DESCRIPTION OF THE DRAWINGS

FIGS. 5b and 5c are plan views of the armatures according to the embodiments shown in FIGS. 3 and 4, respectively;

FIGS. 6a, 6b and 7 are developed views of magnetic poles and armatures according to different embodiments in which the present invention is applied to commutator motors;

DETAILED DESCRIPTION OF THE PREFERRED EMBODIMENTS

Figure 2:
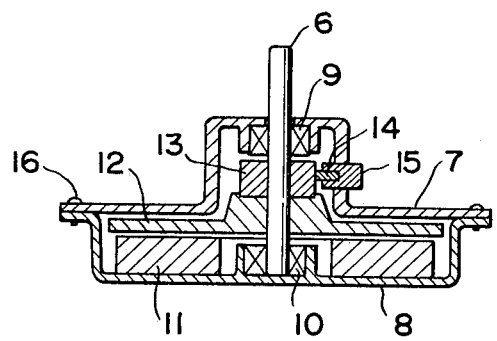
FIG. 2 is a cross-sectional view explanatory of the construction of a commutator motor to which the present invention is applicable.

FIG. 2 is a cross-sectional view of a commutator motor with a disc-shaped commutator. In the figure, a bearing 10 is fixed to a casing 8 made of press-formed soft steel. Further, a casing 7 made of press-formed soft steel is secured to the casing 8 by screws 16, forming a magnetic circuit therebetween. A bearing 9 is fixed to the casing 7. A rotating shaft 6 is supported by the bearings 9 and 10. One end of the rotating shaft 6 is in pressure contact with the casing 8. An annular field magnet 11, with magnetic poles N and S thereof magnetized in the axial direction of the rotating shaft 6, is secured to the casing 8. To the rotating shaft 6, there are fixed an armature 12 and a commutator 13 serving as power supply control means for the armature 12, which are molded integrally. The armature 12 is located in a field air gap between the casing 7 and the field magnet 11. The reference numeral 15 indicates a brush support for supporting brushes 14 which are in sliding contact with the commutator 13, which serves as power supply control means.

Referring to FIGS. 3 to 11, embodiments of the abovedescribed commutator motor provided with a disc-shaped armature, to which the present invention is applied, will now be explained.

Figure 1:
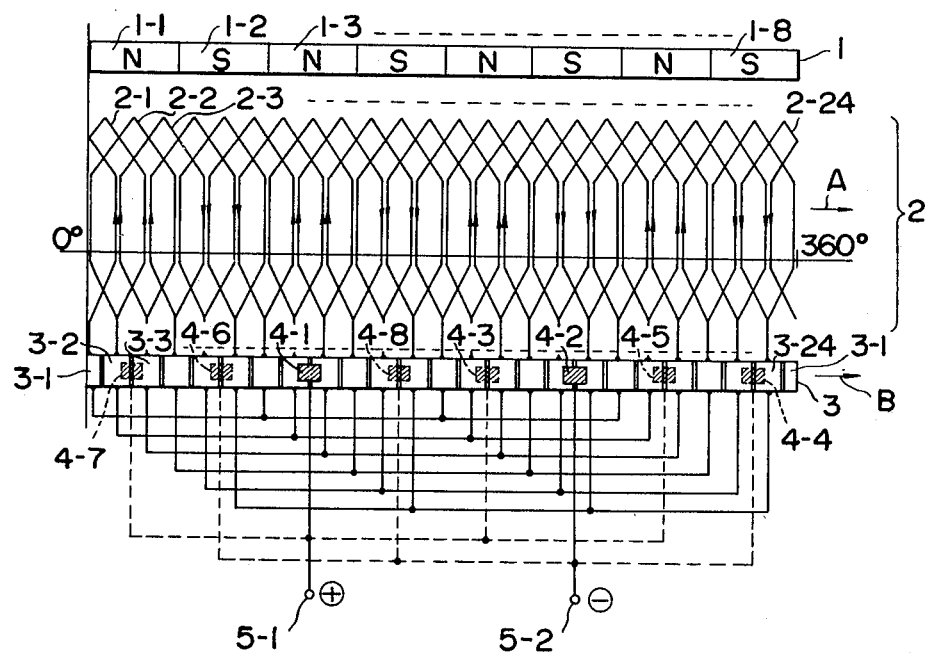
FIG. 1 is a developed view of conventional magnetic poles of a field magnet and an armature.
Figure 3:
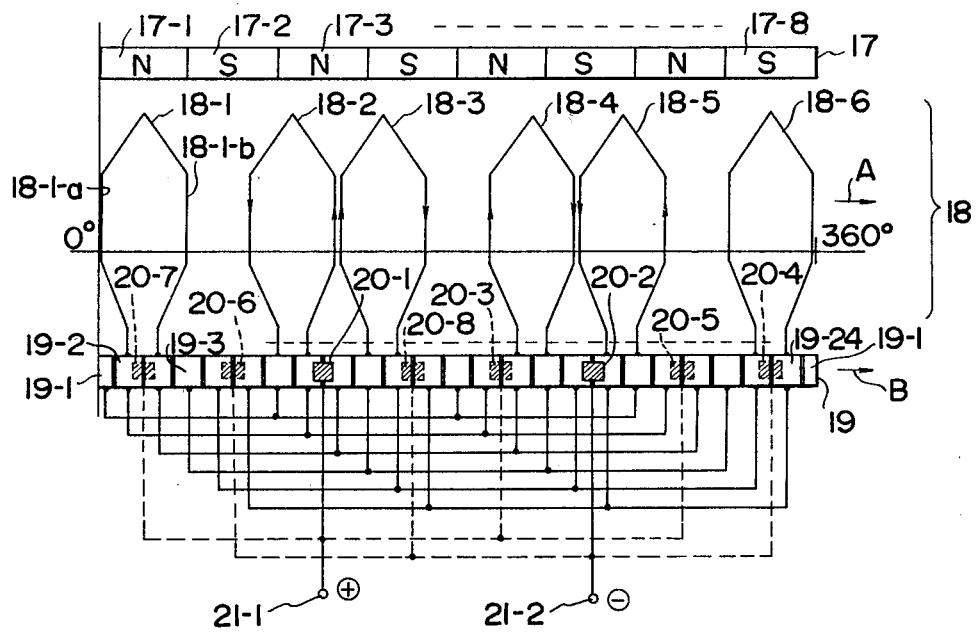
FIGS. 3 and 4 are developed views of magnetic poles and armatures according to different embodiments in which the present invention is applied to commutator motors.
Figure 5A:
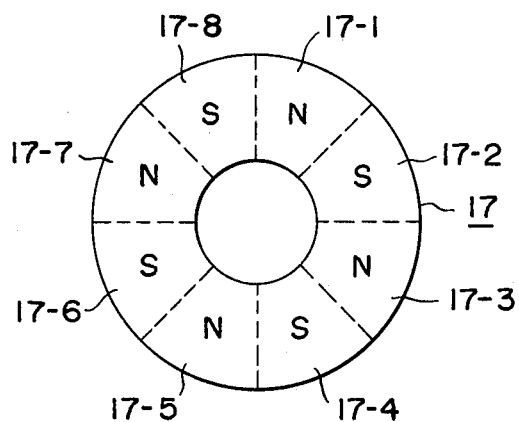
FIG. 5a is a plan view of the magnetic poles according to the embodiments shown in FIGS. 3 and 4.
Figure 5B:
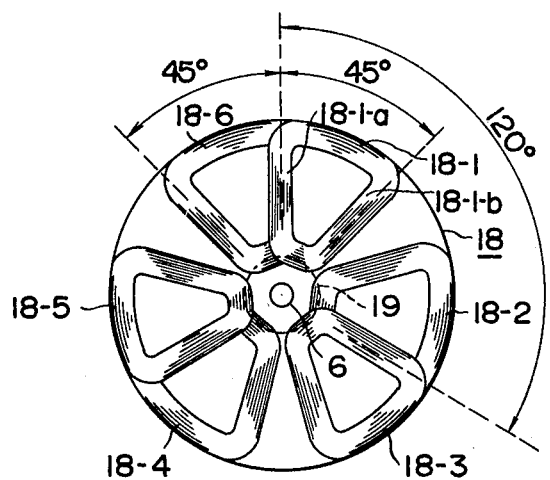

Referring to FIG. 3, there is shown a developed view of an embodiment of a DC motor comprising a field magnet with 8 (=2mn) magnetic poles, 6 (=m(2n−2)) armature coils and 24 (=mn(2n−2)) commutator segments, where m=1 (m may be an integer of 1 or more) and n=4 (n may be an integer of 4 or more). In this embodiment, the armature coils are reduced in number in comparison with the prior example shown in FIG. 1. As shown in FIG. 5(a), a field magnet 17 is provided with magnetic poles 17-1, 17-2, ..., 17-8, magnetized alternately to N and S with 45 degree angular intervals in the axial direction of the rotating shaft. The field magnet 17 corresponds to the field magnet 11 shown in FIG. 2. A commutator 19, which serves as power supply control means for the armature, comprises commutator segments 19-1, 19-2, ..., 19-24, with 15 degree angular intervals ($\frac{1}{3}$ the magnetic pole width). Every 4 (=mn) commutator segments, which are spaced by 90 degree (=360/mn) angular intervals (2/1 the magnetic pole width), are electrically short-circuited by electrically conductive short-circuit members. More specifically, the commutator segments 19-1, 19-7, 19-13 and 19-19 are short-circuited with each other. Likewise, the commutator segments 19-2, 19-8, 19-14 and 19-20 are short-circuited with each other; the commutator segments 19-3, 19-9, 19-15 and 19-21 are short-circuited with each other; the commutator segments 19-4, 19-10, 19-16 and 19-22 are short-circuited with each other; the commutator segments 19-5, 19-11, 19-17 and 19-23 are short-circuited with each other; and the commutator segments 19-6, 19-12, 19-18 and 19-24 are short-circuited with each other. The commutator 19 corresponds to the commutator 13 shown in FIG. 2. In an armature 18, armature coils 18-1, 18-2, ..., 18-6 are arranged as shown in FIG. 5(b) and those armature coils are integrally molded. More specifically, the armature coils 18-1, 18-3 and 18-5 are arranged adjacent to each other on an upper surface of a disc-shaped armature with an equal pitch of 120 degree angular intervals (8/3 the magnetic pole width). The angular intervals of the conductor portions (in the case of the armature coil 18-1, its conductor portions are portions 18-1-a and 18-1-b), which conductive portions contribute to the generation of a torque, are set at 45 degrees so as to be equal to the magnetic pole width. The armature coils 18-2, 18-4 and 18-6 are arranged on a lower surface of the disc-shaped armature and angularly spaced by the same angular interval. The armature coil group on the upper surface of the disc-shaped armature is angularly spaced 45 degrees (the magnetic pole width) from the armature coil group on the lower surface of the disc-shaped armature, the armature coil groups being overlapped in two layers. The armature coils are magnetically angularly spaced respectively from the magnetic poles 17-1, 17-2, ..., 17-8 of the field magnet 17 by 60 degrees (=360/(2n−2)). The armature coils and the magnetic poles jointly define the disc-shaped armature, which corresponds to the armature 12 as shown in FIG. 2.

Referring back to FIG. 3, one end of the armature coil 18-1 is connected to the commutator segment 19-2, and the other end of the armature coil 18-1 is connected to the commutator segment 19-3. Likewise, the opposite ends of the armature coil 18-2 are connected respectively to the commutator segments 19-7 and 19-8; the opposite ends of the armature coil 18-3 are connected respectively to the commutator segments 19-10 and 19-11; the opposite ends of the armature coil 18-4 are connected respectively to the commutator segments 19-15 and 19-16; the opposite ends of the armature coil 18-5 are connected respectively to the commutator segments 19-18 and 19-19; and the opposite ends of the armature coil 18-6 are connected respectively to the commutator segments 19-23 and 19-24. Thus, in the arrangement in which the armature coils correspond respectively to the magnetic poles 17-1, 17-2, . . . , 17-8 of the field magnet 17, the ends of an armature coil having a closest relationship to its corresponding magnetic pole with respect to the relationship of any desired armature coil to its corresponding magnetic pole, and the ends of that desired armature coil are connected through the commutator coils so that the armature coils are wound in the same direction. Such a connection arrangement applies to other embodiments according to the present invention, which will be described later. Reference numerals 20-1 and 20-2 represent brushes which serves as electric power supply control means and are held in sliding contact with the commutator segments. To the brushes 20-1 and 20-2, power is supplied from a positive pole 21-1 and a negative pole 21-2 of a DC power source. The angular intervals of the brushes 20-17 and 20-2 are 135 degrees (3/1 the magnetic pole width). However, 45 (=360/2mn) degree angular intervals (equal to the magnetic pole width), 225 degree angular intervals (5/1 the magnetic pole width) or 315 degree angular intervals (7/1 the magnetic pole width) can be equivalently adopted. As shown by the dotted lines, use of the brushes 20-1, 20-2, . . . , 20-8 renders short-circuitting of the commutator segments unnecessary. More specifically, the first group of 4 (=mn) brushes 20-1, 20-3, 20-5 and 20-7 are angularly spaced 90 degrees (=360/mn) (2/1 the magnetic pole width) and are supplied with power from the positive pole 21-1 of the DC power supply. The second group of 4 (=mn) brushes 20-2, 20-4, 20-6 and 20-8 are angularly spaced by the same angular intervals and are supplied with power from the negative pole 21-2 of the DC power supply. The first and second groups of brushes are angularly spaced from each other by 45 degrees (=360/2mn) (the magnetic pole width). The foregoing arrangement may be utilized in the embodiments which will be described later. The armature coils are supplied with electric currents that flow in the directions of the arrowheads, and which produce torques in the armature coils, whereupon the armature 18 and the commutator 19 rotate in the directions of the arrows A and B, respectively. The switching of armature current is performed 24 (=mn(2n−2)) times per revolution of the armature 18, and torques are successively generated. Thus, the armature 18 and the commutator 19 work as a commutator motor.

Figure 4:
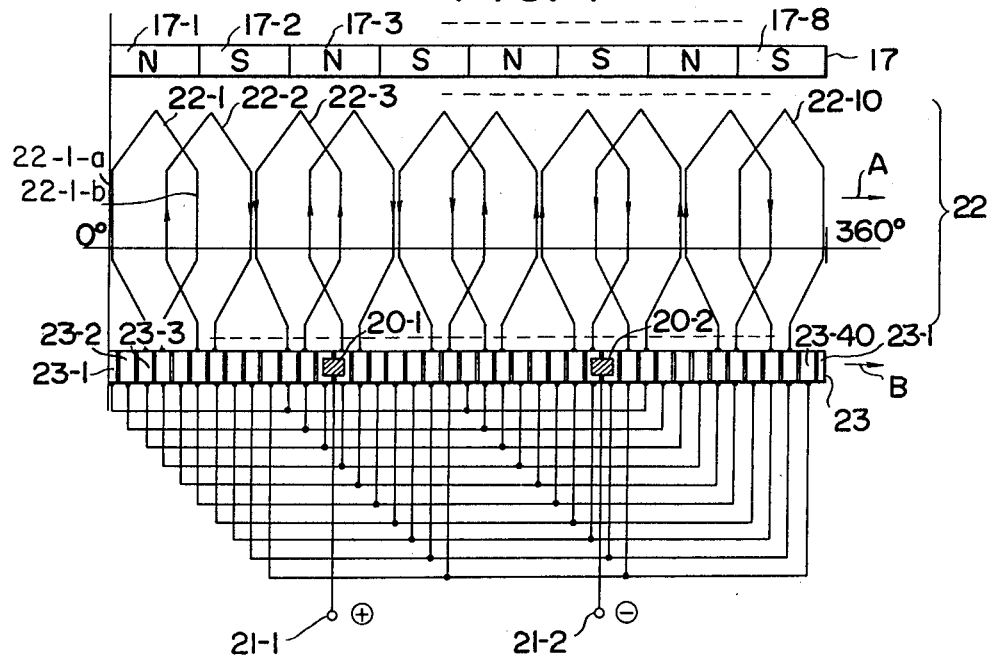

FIG. 4 is a developed view of an embodiment of a DC motor according to the present invention, comprising a field magnet with 8 (=2mn) magnetic poles, 10 (=m(2n+2)) armature coils, and 40 (=mn(2n+2)) commutator segments, where m=1 and n=4. The field magnet 17 is the same as that shown in FIG. 3. A commutator 23 which serves as power supply control means comprises commutator segments 23-1, 23-2, . . . , 23-40, with 9 degree angular interval (1/5 the magnetic pole width). Every 4 (=mn) commutator segments, which are spaced by 90 degree (=360/mn) angular intervals (2/1 the magnetic pole width), are electrically short-circuited by electrically conductive short-circuit members. More specifically, the commutator segments 23-1, 23-11, 23-21 and 23-31 are short-circuited with each other. Likewise, the commutator segments 23-2, 23-12, 23-22 and 23-32 are short-circuited with each other; the commutator segments 23-3, 23-13, 23-23 and 23-33 are short-circuited with each other; the commutator segments 23-4, 23-14, 23-24 and 23-34 are short-circuited with each other; the commutator segments 23-5, 23-15, 23-25 and 23-35 are short-circuited with each other; the commutator segments 23-6, 23-16, 23-26 and 23-36 are short-circuited with each other; the commutator segments 23-7, 23-17, 23-27 and 23-37 are short-circuited with each other; the commutator segments 23-8, 23-18, 23-28 and 23-38 are short-circuited with each other; the commutator segments 23-9, 23-19, 23-29 and 23-39 are short-circuited with each other; and the commutator segments 23-10, 23-20, 23-30 and 23-40 are short-circuited with each other. The commutator 23 thus corresponds to the commutator 13 illustrated in FIG. 2. As shown in FIG. 5(c), an armature 22 comprises armature coils 22-1, 22-2, . . . , 22-10 which are integrally molded. The armature coils 22-1, 22-3, 22-5, 22-7 and 22-7 are juxtaposed on an upper surface of a disc-shaped armature and angularly spaced from adjacent ones by an equal pitch of 72 degrees (8/5 the magnetic pole width). The angular intervals of the conductor portions (in the case of the armature coil 22-1, its conductor portions are portions 22-1-a and 22-1-b), which conductive portions contribute to the generation of a torque, are 45 degrees (the magnetic pole width). The armature coils 22-2, 22-4, 22-6, 22-8 and 22-10 are juxtaposed on a lower surface of the disc-shaped armature and angularly spaced from adjacent ones by 72 degrees. The armature coil groups on the upper and lower surfaces of the disc-shaped armature are angularly spaced from each other by 27 degrees (3/5 the magnetic pole width) and are superimposed in two layers. The armature coils are magnetically angularly spaced 36 degrees (=360/(2n+2)) respectively from the magnetic poles 17-1, 17-2, . . . , 17-8 of the field magnet 17. The disc-shaped armature thus constructed corresponds to the armature 12 shown in FIG. 2.

Referring back to FIG. 4, one end of the armature coil 22-1 is connected to the commutator segment 23-3, and the other end of the armature coil 22-1 is connected to the commutator segment 23-4. Likewise, the opposite ends of the armature coil 22-2 are respectively connected to the commutator segments 23-6 and 23-7; the opposite ends of the armature coil 22-3 are respectively connected to the commutator segments 23-11 and 23-12; the opposite ends of the armature coil 22-4 are respectively connected to the commutator segments 23-14 and 23-15; the opposite ends of the armature coil 22-5 are respectively connected to the commutator segments 23-19 and 23-20; the opposite ends of the armature coil 22-6 are respectively connected to the commutator segments 23-22 and 23-23; and the opposite ends of the armature coil 22-7 are respectively connected to the commutator segments 23-27 and 23-28; the opposite ends of the armature coil 22-8 are connected respectively to the commutator segments 23-30 and 23-31; the opposite ends of the armature coil 22-9 are connected respectively to the commutator segments 23-35 and 23-36; and the opposite ends of the armature coil 22-10 are connected respectively to the commutator segments 23-38 and 23-39.

The angular intervals and others of the brushes 20-1 and 20-2 are the same as those explained by referring to FIG. 3.

In the configuration as shown in FIG. 4, an electric current flows in the directions of the arrowheads and a torque is generated in each armature coil, so that the armature 22 and the commutator 23 are respectively rotated in the directions of the arrows A and B. The switching of an armature current is performed 40 (=mn(2n+2)) times (except the singular point) per revolution, and torques are successively generated. Thus, the armature 22 and the commutator 23 work as commutator motor.

Figure 6B:
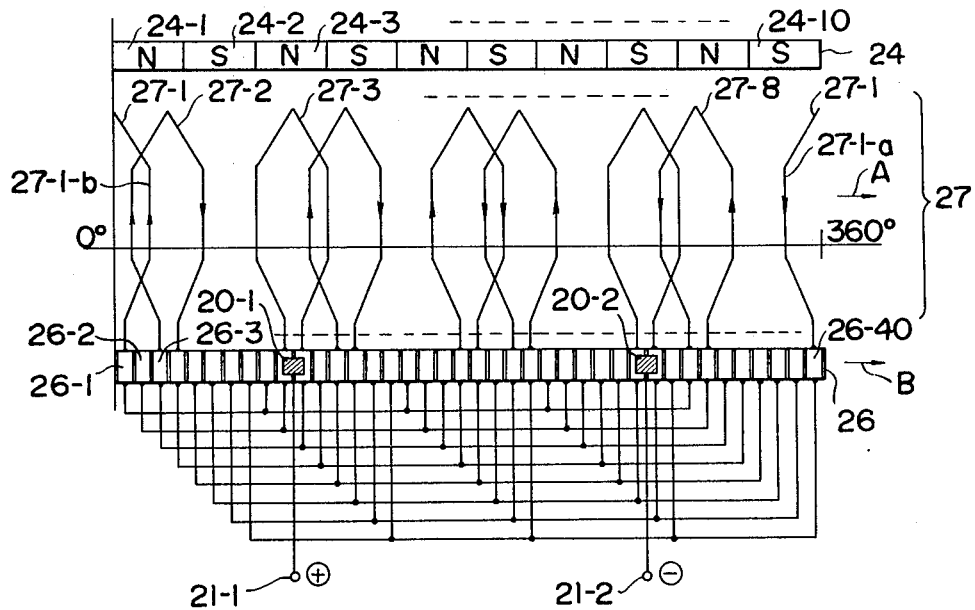
Figure 8A:
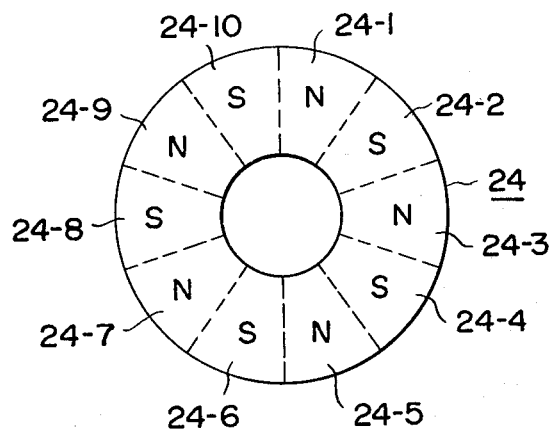
FIG. 8a is a plan view of the magnetic poles according to the embodiments illustrated in FIGS. 6a, 6b and 7.
Figure 8B:
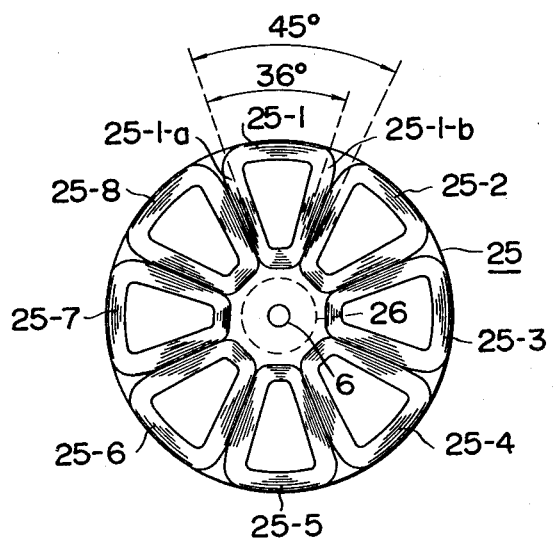
FIGS. 8b, 8c and 8d are plan views of the armature according to the embodiments illustrated in FIGS. 6a, 6b and 7.

FIGS. 6a and 6b are developed views of other embodiments of a DC motor according to the present invention, comprising a field magnet with 10 (=2mn) magnetic poles, 8 (=m(2n−2)) armature coils and 40 (=mn(2n−2)) commutator segments, where m=1 and n=5. As shown in FIG. 8(a), a field magnet 24 is provided with magnetic poles 24-1, 24-2, ..., 24-10 magnetized alternately to N and S with 36 degree angular intervals in the axial direction of the rotating shaft. The field magnet 24 corresponds to the field magnet 11 shown in FIG. 2. A commutator 26 which serves as power supply control means comprises commutator segments 26-1, 26-2, ..., and 26-40 arranged with 9 degree angular intervals (¼ the magnetic pole width). Every 4 (=mn) commutator segments, which are spaced by 72 degree (=360/mn) angular intervals (2/1 the magnetic pole width), are electrically short-circuited by electrically conductive short-circuit members. More specifically, the commutator segments 26-1, 26-9, 26-17, 26-25 and 26-33 are short-circuited with each other. Likewise, the commutator segments 26-2, 26-10, 26-18, 26-26 and 26-34 are short-circuited with each other; the commutator segments 26-3, 26-11, 26-19, 26-27 and 26-35 are short-circuited with each other; the commutator segments 26-4, 26-12, 26-20, 26-28 and 26-36 are short-circuited with each other; the commutator segments 26-5, 26-13, 26-21, 26-29 and 26-37 are short-circuited with each other; the commutator segments 26-6, 26-14, 26-22, 26-30 and 26-38 are short-circuited with each other; the commutator segments 26-7, 26-15, 26-23, 26-31 and 26-39 are short-circuited with each other; and the commutator segments 26-8, 26-16, 26-24, 26-32 and 26-40 are short-circuited with each other. The commutator 26 corresponds to the commutator 13 shown in FIG. 2. An armature 25 of FIG. 6(a) has armature coils 25-1, 25-2, ..., 25-8 arranged as illustrated in FIG. 8(b) and molded integrally with each other. More specifically, the armature coils are arranged adjacent to each other, without overlapping on each other, with an equal pitch of 45 degree angular intervals (5/4 the magnetic pole width). In this arrangement, the angular intervals of the conductor portions (in the case of the armature coil 25-1, its conductor portions are portions 25-1-a and 25-1-b), which conductor portions contribute to the generation of a torque in each armature coil, are 36 degrees (=the magnetic pole width). The armature coils are magnetically angularly spaced a phase angle of 45 degrees (=360/(2n−2)) from the magnetic poles 24-1, 24-2, ..., 24-10 of the field magnet 24. The armature 25 thus constructed constituted is of a discshaped configuration and corresponds to the armature 12 shown in FIG. 2. Referring back to FIG. 6(a), one end of the armature coil 25-1 is connected to the commutator segment 26-40, and the other end of the armature coil 25-1 is connected to the commutator segment 26-1. Likewise, the opposite ends of the armature coil 25-2 are connected respectively to the commutator segment 26-5 and 26-6; the opposite ends of the armature coil 25-3 are connected respectively to the commutator segments 26-10 and 26-11; the opposite ends of the armature coil 25-4 are connected respectively to the commutator segments 26-15 and 26-16; the opposite ends of the armature coil 25-5 are connected respectively to the commutator segments 26-20 and 26-21; the opposite ends of the armature coil 25-6 are connected respectively to the commutator segments 26-25 and 26-26; the opposite ends of the armature coil 25-7 are connected respectively to the commutator segments 26-30 and 26-31; and the opposite ends of the armature coil 25-8 are connected respectively to the commutator segments 26-35 and 26-36.

Figure 8C:
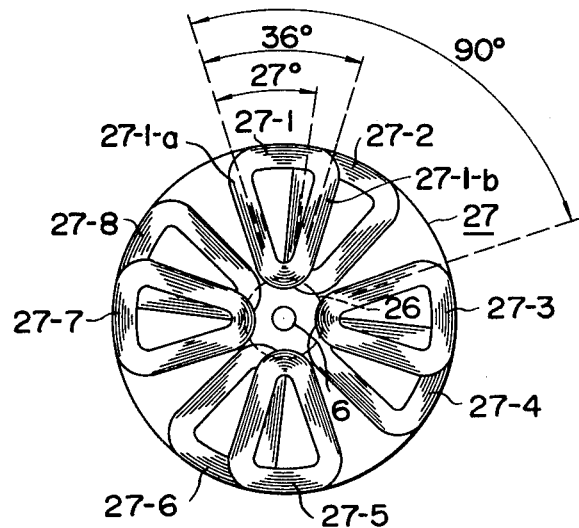

An armature 27 shown in FIG. 6(b) has armature coils 27-1, 27-2, ..., 27-8 arranged as illustrated in FIG. 8(c) and molded integrally with each other. More specifically, the armature coils 27-1, 27-3, 27-5, and 27-7 are mounted in juxtaposed relation on an upper surface of a disc-shaped armature and angularly spaced from adjacent ones by an equal pitch of 90 degrees (5/2 of the magnetic pole width). The angular intervals of the conductor portions (in the case of the armature coil 27-1, its conductor portions are denoted by 27-1-a and 27-1-b), which conductor portions contribute to the generation of a torque in each armature coil, are 36 degrees which are equal to the magnetic pole width. The armature coils 27-2, 27-4, 27-6 and 27-8 are mounted in juxtaposed relation on a lower surface of the disc-shaped armature and angularly spaced 90 degrees from adjacent ones. The upper and lower armature coil groups are angularly spaced 27 degrees (¾ the magnetic pole width) and superimposed in two layers. The armature coils are magnetically angularly spaced a phase angle of 45 degrees (=360/(2n−2)) respectively from the magnetic poles 24-1, 24-2, ..., 24-10 of the field magnet 24. The armature 27 thus constructed is of a disc-shaped configuration and corresponds to the armature 12 shown in FIG. 2. Referring back to FIG. 6(b), one end of the armature coil 27-1 is connected to the commutator segment 26-40, and the other end of the armature coil 27-1 is connected to the commutator segment 26-1. Likewise, the opposite ends of the armature coil 27-2 are connected respectively to the commutator segments 26-3 and 26-4; the opposite ends of the armature coil 27-3 are connected respectively to the commutator segments 26-10 and 26-11; the opposite ends of the armature coil 27-4 are connected respectively to the commutator segments 26-13 and 26-14; the opposite ends of the armature coil 27-5 are connected respectively to the commutator segments 26-20 and 26-21; the opposite ends of the armature coil 27-6 are connected respectively to the commutator segments 26-23 and 26-24; the opposite ends of the armature coil 27-7 are connected respectively to the commutator segments 26-30 and 26-31; and the opposite ends of the armature coil 27-8 are connected respectively to the commutator segments 26-33 and 26-34.

The reference numerals 20-1 and 20-2 in FIGS. 6(a) and 6(b) represent brushes slidable on the commutator segments, to which brushes power is supplied from a positive pole 21-1 and a negative pole 21-2 of a DC power source, respectively. The angular intervals of the brushes 20-1 and 20-2 are 180 degrees (5/1 the magnetic pole width). However, 36 (=360/2mn) degree angular intervals (equal to the magnetic pole width), 108 degree angular intervals (3/1 the magnetic pole width), 252 degree angular intervals (7/1 the magnetic pole width), or 324 degree angular intervals (9/1 the magnetic pole width) may equivalently be employed.

In the configuration as shown, an electric current flows in the directions of the arrowheads, and a torque is generated in each armature coil, so that the armatures 25, 27 and the commutator 26 are respectively rotated in the directions of the arrows A and B. The switching of an armature current is performed 40 (=mn(2n−2)) times (except the singular point) per revolution, so that torques are successively generated. Thus, the armatures 25, 27 and the commutator 29 work as a commutator motor.

Figure 7:
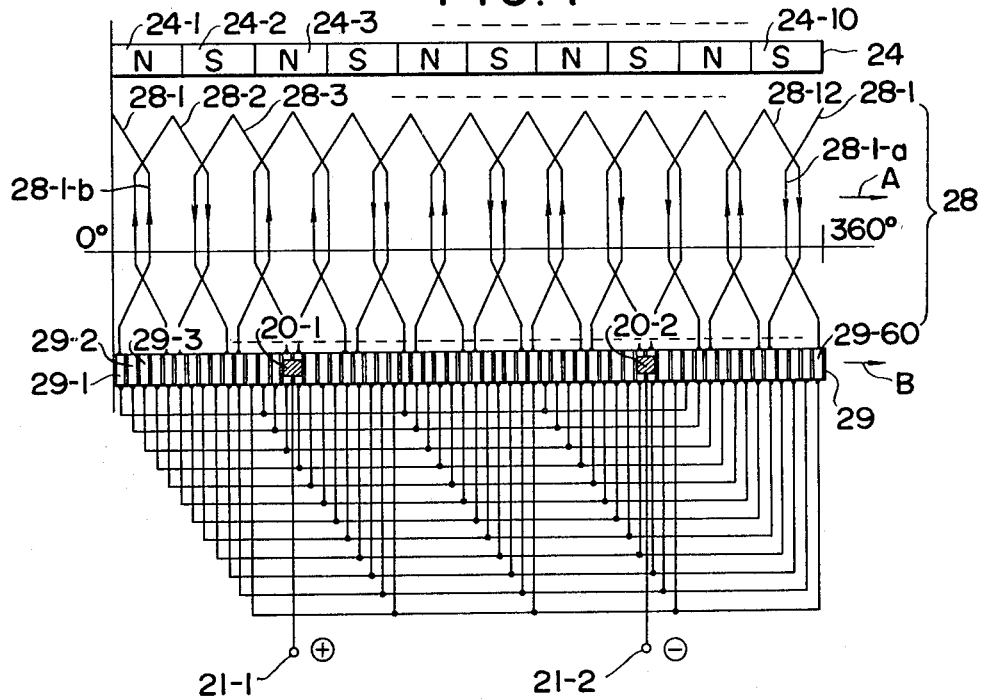
Figure 8D:
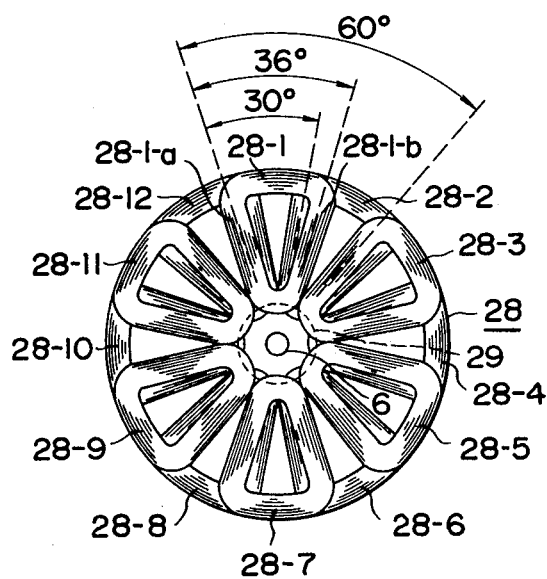

Referring to FIG. 7, there is shown a developed view of still another embodiment of a DC motor according to the present invention, comprising a field magnet with 10 (=2mn) magnetic poles, 12 (=m(2n+2)) armature coils, and 60 (=mn (2n+2)) commutator segments, where m=1 and n=5. The field magnet 24 is the same as that shown in FIG. 6. A commutator 29 which serves as power supply control means comprises commutator segments 29-1, 29-2, ..., 29-60 arranged with 6 degree angular intervals (1/6 the magnetic width). Every 5 (=mn) commutator segments, which are spaced by 72 degree (=360/mn) angular intervals (2/1 the magnetic pole width), are electrically short-circuited by electrically conductive short-circuit members. More specifically, the commutator segments 29-1, 29-13, 29-25, 29-37 and 29-49 are short-circuited with each other. Likewise, the commutator segments 29-2, 29-14, 29-26, 29-38 and 29-50 are short-circuited with each other; the commutator segments 29-3, 29-15, 29-27, 29-39 and 29-51 are short-circuited with each other; the commutator segments 29-4, 29-16, 29-28, 29-40 and 29-52 are short-circuited with each other; the commutator segments 29-5, 29-17, 29-29, 29-41 and 29-53 are short-circuited with each other; the commutator segments 29-6, 29-18, 29-30, 29-42 and 29-54 are short-circuited with each other; the commutator segments 29-7, 29-19, 29-31, 29-43 and 29-55 are short-circuited with each other; the commutator segments 29-8, 29-20, 29-32, 29-44 and 29-56 are short-circuited with each other; the commutator segments 29-9, 29-21, 29-33, 29-45 and 29-57 are short-circuited with each other; the commutator segments 29-10, 29-22, 29-34, 29-46 and 29-58 are short-circuited with each other; the commutator segments 29-11, 29-23, 29-35, 29-47 and 29-59 are short-circuited with each other; and the commutator segments 29-12, 29-24, 29-36, 29-48 and 29-60 are short-circuited with each other. The commutator 29 corresponds to the commutator 13 shown in FIG. 2. An armature 28 has armature coils 28-1, 28-2, ..., 28-12 arranged as shown in FIG. 8(d) and molded integrally with each other. More specifically, the armature coils 28-1, 28-3, 28-5, 28-7, 28-9 and 28-11 are mounted in juxtaposed relation on an upper surface of a disc-shaped armature and angularly spaced from adjacent ones by an equal pitch of 60 degrees (5/3 the magnetic pole width). The angular intervals of the conductor portions (in the case of the armature coil 28-1, its conductor portions are portions 28-1-a and 28-1-b), which conductor portions contribute to the generation of a torque in each armature coil, are 36 degrees which are equal to the magnetic pole width. The armature coils 28-2, 28-4, 28-6, 28-8, 28-10 and 28-12 are mounted in juxtaposed relation on a lower surface of the disc-shaped armature and angularly spaced 60 degrees from adjacent ones. The upper and lower groups of armature coils are angularly spaced from each other by a phase angle of 30 degrees (5/6 the magnetic pole width) and are superimposed in two layers. The armature coils are magnetically angularly spaced a phase angle of 30 degrees (=360/(2n+2)) respectively from the magnetic poles 24-1, 24-2, ..., 24-10 of the field magnet 24. The disc-shaped armature thus provided corresponds to the armature 12 illustrated in FIG. 2.

Referring back to FIG. 7, one end of the armature coil 28-1 is connected to the commutator segment 29-60, and the other end of the armature coil 28-1 is connected to the commutator segment 29-1. Likewise, the opposite ends of the armature coil 28-2 are connected respectively to the commutator segments 295 and 296; the opposite ends of the armature coil 28-3 are connected respectively to the commutator segments 29-10 and 29-11; the opposite ends of the armature coil 28-4 are connected respectively to the commutator segments 29-15 and 29-16; the opposite ends of the armature coil 28-5 are connected respectively to the commutator segments 29-20 and 29-21; the opposite ends of the armature coil 28-6 are connected respectively to the commutator segments 29-25 and 29-26; the opposite ends of the armature coil 28-7 are connected respectively to the commutator segments 29-30 and 29-31; the opposite ends of the armature coil 28-8 are connected respectively to the commutator segments 29-35 and 29-36; the opposite ends of the armature coil 28-9 are connected respectively to the commutator segments 29-40 and 29-41; the opposite ends of the armature coil 28-10 are connected respectively to the commutator segments 29-45 and 29-46; the opposite ends of the armature coil 28-11 are connected respectively to the commutator segments 29-50 and 29-51; and the opposite ends of the armature coil 28-12 are connected respectively to the commutator segments 29-55 and 29-56.

The angular intervals and others of the brushes 20-1 and 20-2 are the same as those explained by referring to FIG. 6.

In the configuration as shown in FIG. 7, an electric current flows in the directions of the arrowheads and a torque is generated in each armature coil, so that the armature 28 and the commutator 29 are respectively rotated in the directions of the arrows A and B. The switching of an armature current is performed 60 (=mn(2n+2)) times (except the singular point) per revolution, and torques are successively generated. Thus, the armature 28 and the commutator 29 work as a commutator motor.

Figure 9:
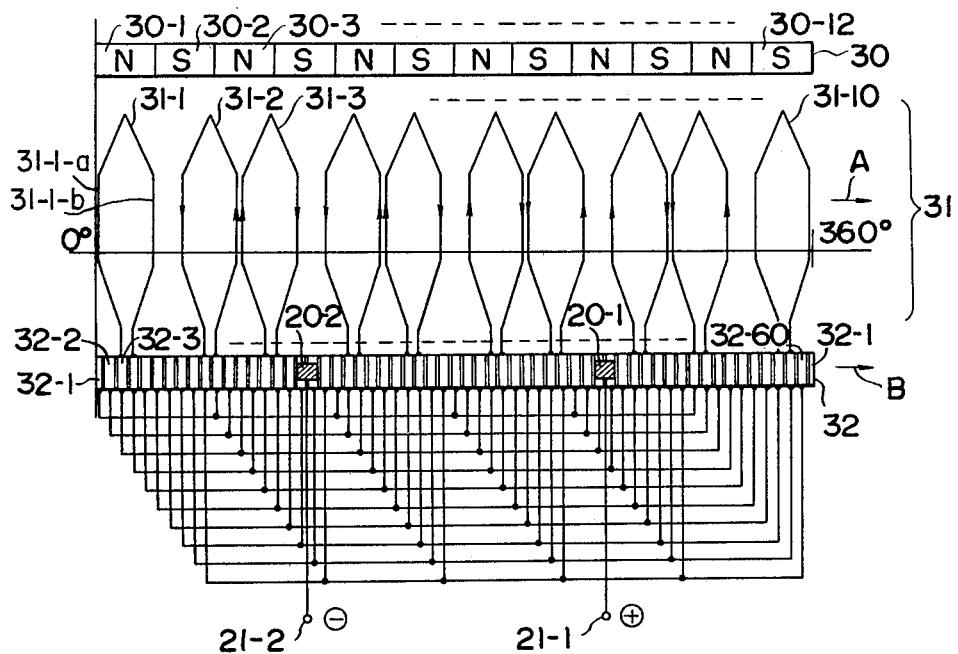
FIGS. 9 and 10 are developed views of magnetic poles and armatures according to different embodiments in which the present invention is applied to commutator motors.
Figure 11A:
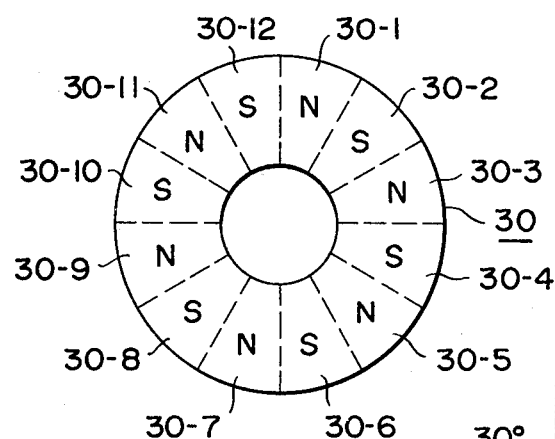
FIG. 11a is a plan view of the magnetic poles according to the embodiments of FIGS. 9 and 10.
Figure 11B:
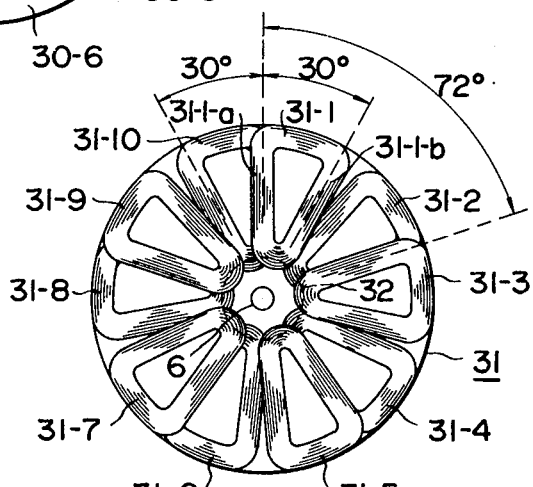
FIGS. 11b and 11c are plan views of the armatures according to the embodiments of FIGS. 9 and 10.
Figure 11C:
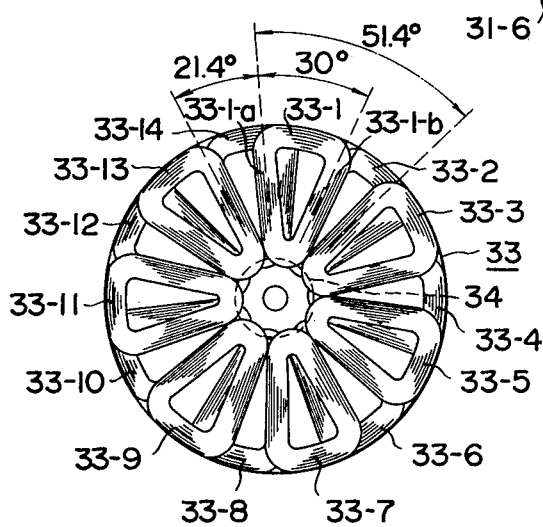

FIG. 9 is a developed view of still another embodiment of a DC motor according to the present invention, comprising a field magnet with 12 (=2mn) magnetic poles, 10 (=m(2n−2)) armature coils and 60 (=mn(2n−2)) commutator segments, where m=1 and n=6. As shown in FIG. 11(a), a field magnet 30 is provided with magnetic poles 30-1, 30-2, ..., and 30-10, magnetized alternately to N and S with 30 degree angular intervals in the axial direction of the rotating shaft. The field magnet 30 corresponds to the field magnet 11 shown in FIG. 2. A commutator 32 which serves as power supply control means comprises commutator segments 32-1, 32-2, ..., and 32-60 arranged with 6 degree angular intervals (1/5 the magnetic pole width). Every 6 (=mn) commutator segments, which are spaced by 60 degree (=360/mn) angular intervals (2/1 the magnetic pole width), are electrically short-circuited by electrically conductive short-circuit members. More specifically, the commutator segments 32-1, 32-11, 32-21, 32-31, 32-41 and 32-51 are short-circuited with each other. Likewise, the commutator segments 32-2, 32-12, 32-22, 32-32, 32-42 and 32-52 are short-circuited with each other; the commutator segments 32-3, 32-13, 32-23, 32-33, 32-43 and 32-53 are short-circuited with each other; the commutator segments 32-4, 32-14, 32-24, 32-34, 32-44 and 32-54 are short-circuited with each other; the commutator segments 32-5, 32-15, 32-25, 32-35, 32-45 and 32-55 are short-circuited with each other; the commutator segments 32-6, 32-16, 32-26, 32-36, 32-46 and 32-56 are short-circuited with each other; the commutator segments 32-7, 32-17, 32-27, 32-37, 32-47 and 32-57 are short-circuited with each other; the commutator segments 32-8, 32-18, 32-28, 32-38, 32-48 and 32-58 are short-circuited with each other; the commutator segments 32-9, 32-19, 32-29, 32-39, 32-49 and 32-59 are short-circuited with each other; and the commutator segments 32-10, 32-20, 32-30, 32-40, 32-50 and 32-60 are short-circuited with each other. The commutator 32 corresponds to the commutator 13 shown in FIG. 2. An armature 31 includes armature coils 31-1, 31-2, ..., 31-10 arranged as illustrated in FIG. 11(b) and molded integrally with each other. More specifically, the armature coils 31-1, 31-3, 31-5, 31-7 and 31-9 are juxtaposed on an upper surface of a disc-shaped armature and angularly spaced from adjacent ones by an equal pitch of 72 degrees (12/5 the magnetic pole width). The angular intervals of the conductor portions (in the case of the armature coil 31-1, its conductor portions are portions 31-1-a and 31-1-b), which conductor portions contribute to the generation of a torque in each armature coil, are 30 degrees which are equal to the magnetic pole width. The armature coils 31-2, 31-4, 31-8 and 31-10 are juxtaposed on a lower surface of the disc-shaped armature and angularly spaced 30 degrees from adjacent ones. The upper and lower groups of armature coils are angularly spaced from each other by a phase difference of 30 degrees (the magnetic pole width) and are superimposed in two layers. The armature coils are magnetically angularly spaced a phase angle of 36 degrees (=360/(2n−2)) respectively from the magnetic poles 30-1, 30-2, ..., 30-10 of the field magnet 30. The disc-shaped armature thus constructed corresponds to the armature 12 illustrated in FIG. 2.

Turning back to FIG. 9, one end of the armature coil 31-1 is connected to the commutator segment 32-3, and the other end of the armature coil 31-1 is connected to the commutator segment 32-4. Likewise, the opposite ends of the armature coil 31-2 are connected respectively to the commutator segments 32-10 and 32-11; the opposite ends of the armature coil 31-3 are connected respectively to the commutator segments 32-15 and 32-16; the opposite ends of the armature coil 31-4 are connected respectively to the commutator segments 32-22 and 32-23; the opposite ends of the armature coil 31-5 are connected respectively to the commutator segments 32-27 and 32-28; the opposite ends of the armature coil 31-6 are connected respectively to the commutator segments 32-34 and 32-35; the opposite ends of the armature coil 31-7 are connected respectively to the commutator segments 32-39 and 32-40; the opposite ends of the armature coil 31-8 are connected respectively to the commutator segments 32-46 and 32-47; the opposite ends of the armature coil 31-9 are connected respectively to the commutator segments 32-51 and 32-52; and the opposite ends of the armature coil 31-10 are connected respectively to the commutator segments 32-58 and 32-59.

The reference numerals 20-1 and 20-2 in FIG. 9 represent brushes slidable on the commutator segments, to which brushes power is supplied from a positive pole 21-1 and a negative pole 21-2 of a DC power source, respectively. The angular intervals of the brushes 20-1 and 20-2 are 150 degrees (5/1 the magnetic pole width). However, 30 (=360/2mn) degree angular intervals (equal to the magnetic pole width), 90 degree angular intervals (3/1 the magnetic pole width), 210 degree angular intervals (7/1 the magnetic pole width), 270 degree angular intervals (9/1 the magnetic pole width), or 330 degree angular intervals (11/1 the magnetic pole width) can be equivalently adopted.

In the configuration as shown in FIG. 9, an electric current flows in the directions of the arrowheads, and a torque is generated in each armature coil, so that the armature 31 and the commutator 32 are respectively rotated in the directions of the arrows A and B. The switching of an armature current is performed 60 (=mn(2n−2)) times (except the singular point) per revolution, so that torques are successively generated. Thus, the armature 31 and the commutator 32 work as a commutator motor.

Figure 10:
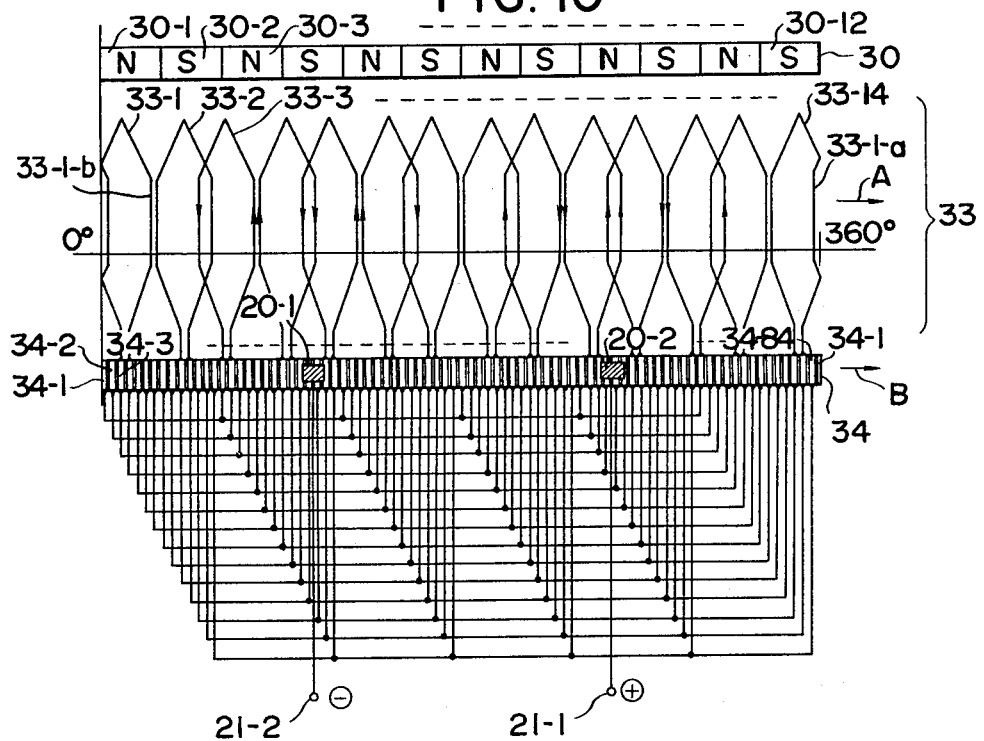

FIG. 10 is a developed view of still another embodiment of a DC motor according to the present invention, comprising a field magnet with 12 (=2mn) magnetic poles, 14 (=m(2n+2)) armature coils and 84 (=mn(2n+2)) commutator segments, where m=1 and n=6. The field magnet 30 is the same as that shown in FIG. 9. A commutator 34 which serves as power supply control means comprises commutator segments 34-1, 34-2, ..., and 34-84 arranged with about 4.3 degree angular interval (1/7 the magnetic pole width). Every 6 (=mn) commutator segments, which are spaced by 60 degree (=360/mn) angular intervals (2/1 the magnetic pole width), are electrically short-circuited by electrically conductive short-circuit members. More specifically, the commutator segments 34-1, 34-15, 34-29, 34-43, 34-57 and 34-71 are short-circuited with each other. Likewise, the commutator segments 34-2, 34-16, 34-30, 34-44, 34-58 and 34-72 are short-circuited with each other; the commutator segments 34-3, 34-17, 34-31, 34-45, 34-59 and 34-73 are short-circuited with each other; the commutator segments 34-4, 34-18, 34-32, 34-46, 34-60 and 34-74 are short-circuited with each other; the commutator segments 34-5, 34-19, 34-33, 34-47, 34-61 and 34-75 are short-circuited with each other; the commutator segments 34-6, 34-20, 34-34, 34-48, 34-62 and 34-76 are short-circuited with each other; the commutator segments 34-7, 34-21, 34-35, 34-49, 34-63 and 34-77 are short-circuited with each other; the commutator segments 34-8, 34-22, 34-36, 34-50, 34-64 and 34-78 are short-circuited with each other; the commutator segments 34-9, 34-23, 34-37, 34-51, 34-65 and 34-79 are short-circuited with each other; the commutator segments 34-10, 34-24, 34-38, 34-52, 34-66 and 34-80 are short-circuited with each other; the commutator segments 34-11, 34-25, 34-39, 34-53, 34-67 and 34-81 are short-circuited with each other; the commutator segments 34-12, 34-26, 34-40, 34-54, 34-68 and 34-82 are short-circuited with each other; the commutator segments 34-13, 34-27, 34-41, 34-55, 34-69 and 34-83 are short-circuited with each other; and the commutator segments 34-14, 34-28, 34-42, 34-56, 34-70 and 34-84 are short-circuited with each other. The commutator 34 corresponds to the commutator 13 illustrated in FIG. 2. An armature 33 includes armature coils 33-1, 33-2, . . . , 33-14 arranged as shown in FIG. 11(b) and molded integrally with each other. More specifically, the armature coils 33-1, 33-3, 33-5, 33-7, 33-9, 33-11 and 33-13 are mounted in juxtaposed relation on an upper surface of a disc-shaped armature and angularly spaced from adjacent ones by an equal pitch of about 51.4 degrees (12/7 the magnetic pole width). The angular intervals of the conductor portions (in the case of the armature coil 33-1, its conductor portions are portions 33-1-a and 33-1-b), which conductor portions contribute to the generation of a torque in each armature coil, are 30 degrees (=the magnetic pole width). The armature coils 33-2, 33-4, 33-6, 33-8, 33-10, 33-12 and 33-14 are mounted in juxtaposed relation on a lower surface of the disc-shaped armature and angularly spaced about 51.4 degrees from adjacent ones. The upper and lower groups of armature coils are angularly spaced from each other by a phase difference of about 21.4 degrees (5/7 the magnetic pole width) and are disposed in two superimposed layers. The armature coils are magnetically angularly spaced a phase angle of about 25.7 ($\div 360/(2n+2) = 360/14$) respectively from the magnetic poles 30-1, 30-2, . . . , 30-12 of the field magnet 30. The disc-shaped armature thus constructed corresponds to the armature 12 shown in FIG. 2.

Referring back to FIG. 10, one end of the armature coil 33-1 is connected to the commutator segment 34-3, and the other end of the armature coil 33-1 is connected to the commutator segment 34-4. Likewise, the opposite ends of the armature coil 33-2 are connected respectively to the commutator segments 34-10 and 34-11; the opposite ends of the armature coil 33-3 are connected respectively to the commutator segments 34-15 and 34-16; the opposite ends of the armature coil 33-4 are connected respectively to the commutator segments 34-22 and 34-23; the opposite ends of the armature coil 33-5 are connected respectively to the commutator segments 34-27 and 34-28; the opposite ends of the armature coil 33-6 are connected respectively to the commutator segments 34-34 and 34-35; the opposite ends of the armature coil 33-7 are connected respectively to the commutator segments 34-39 and 34-40; the opposite ends of the armature coil 33-8 are connected respectively to the commutator segments 34-46 and 34-47; the opposite ends of the armature coil 33-9 are connected respectively to the commutator segments 34-51 and 34-52; the opposite ends of the armature coil 33-10 are connected respectively to the commutator segments 34-58 and 34-59; the opposite ends of the armature coil 33-11 are connected respectively to the commutator segments 34-63 and 34-64; the opposite ends of the armature coil 33-12 are connected respectively to the commutator segments 34-70 and 34-71; the opposite ends of the armature coil 33-13 are connected respectively to the commutator segments 34-75 and 34-76; and the opposite ends of the armature coil 33-14 are connected respectively to the commutator segments 34-82 and 34-83. The angular intervals and others of the brushes 20-1, 20-2 are the same as those explained with reference to FIG. 9.

In the configuration as shown in FIG. 10, an electric current flows in the directions of the arrowheads and a torque is generated in each armature coil, so that the armature 33 and the commutator 34 are respectively rotated in the directions of the arrows A and B. The switching of an armature current is performed 84 (=mn(2n+2)) times (except the singular point) per revolution, and torques are successively generated. Thus, the armature 33 and the commutator 34 work as a commutator motor.

Figure 12:
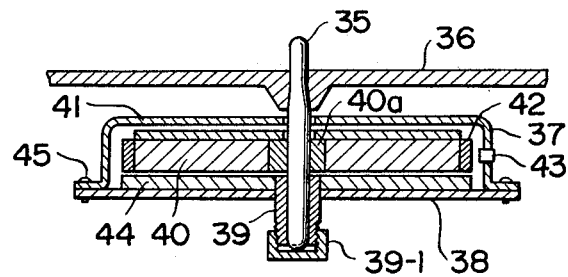
FIG. 12 is a cross-sectional view explanatory of the construction of a semiconductor motor to which the present invention is applicable.

FIG. 12 is an explanatory view of the structure of a semiconductor motor provided with a disc-shaped armature. In the figure, a bearing 39 is fixed to a casing 38 made of press-formed soft steel. Further, a casing 37 made of pressformed soft steel is secured to the casing 38 by screws 45. A rotating shaft 35 for supporting a turntable 36 is rotatably supported by the bearing 39. To the rotating shaft 35 is fixed a magnet rotor 40 through a magnet holder 40a. Around the peripheral surface of the magnet rotor 40, there is fixed a ring-shaped position sensing indication band 42. The magnet rotor 40, which serves as a field magnet, is magnetized with magnetic poles N and S located in the axial direction of the rotating shaft 35. A disc member 41 made of soft steel, forming a magnetic circuit, is attached to the upper surface of the magnet rotor 40. An armature 44 is attached to the inner surface of the casing 38, so that the armature 44 is positioned in the field air gap between the casing 38 and the magnet rotor 40. The reference numeral 43 indicates a support member for a position sensor, which support member is held in a vacant portion formed in the casing 37. In an outer peripheral lower portion of the bearing 39, there is formed a threaded portion over which a screw 39-1 having an internal thread is threaded, so that the rotating shaft 39 can be positionally adjusted in the thrust direction.

Figure 13:
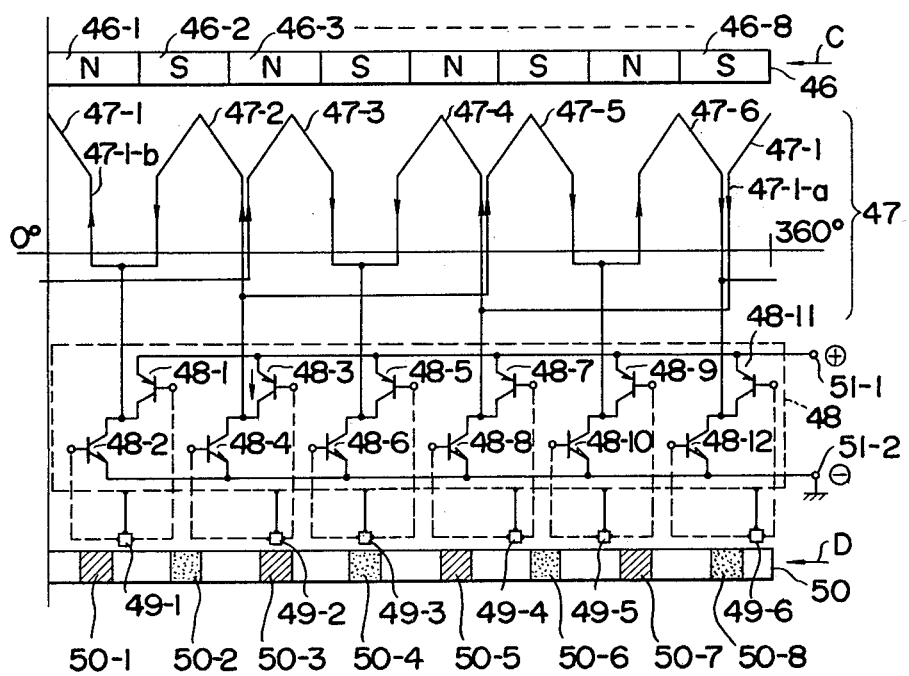
FIG. 13 is a developed view of magnetic poles and an armature of a semiconductor motor to which the present invention is applied.

Referring to FIG. 13, a semiconductor motor provided with the above-described disc-shaped armature, to which the present invention is applied, will now be explained. In the illustrated embodiment, the arrangement illustrated in FIG. 3 is incorporated in the semiconductor motor. However, the other arrangements may also be incorporated in the semiconductor motor.

FIG. 13 is a developed view of an embodiment of a semiconductor motor comprising a field magnet with 8 (=2mn) magnetic poles and 6 (=m(2n-2)) armature coils, where m=1 and n=4.

A magnet rotor 46, which serves as a field magnet, includes magnetic poles 46-1, 46-2, . . . , and 46-8, magnetized to N and S with angular intervals of 45 degrees in the axial direction of the rotating shaft, as shown in FIG. 5(a). The magnetic rotor 46 is rotatable in the direction of the arrow C and corresponds to the magnet rotor 40 shown in FIG. 12. An armature 47 includes armature coils 47-1, 47-2, . . . , 47-6 which are arranged in the same manner as that in which the armature coils 18-1, 18-2, . . . , 18-6 of FIG. 5(b) are arranged. More specifically, the armature coils 47-1, 47-3, 47-5 are mounted in juxtaposed on an upper surface of a disc-shaped armature and angularly spaced from adjacent ones by an equal pitch of 120 degrees (8/3 the magnetic pole width). The armature coils 47-2, 47-4, 47-6 are mounted in juxtaposed relation on a lower surface of the disc-shaped armature and angularly spaced 120 degrees from adjacent ones. The upper and lower groups of armature groups are angularly spaced from each other by a phase difference of 45 degrees (the magnetic pole width) and are disposed in two superimposed layers.

The angular intervals of the electrical conductor portions (in the case of the armature coil 47-1, its conductor portions are denoted by 47-1-$a$ and 47-1-$b$), contributing to the generation of a torque in each armature coil, are 45 degrees, which are equal to the magnetic pole width. The armature coils are magnetically angularly spaced a phase angle of 60 degrees ($=360/(2n-2)$) respectively from the magnet rotors 46-1, 46-2, ..., 46-8. The armature 47 thus constructed corresponds to the armature 44 of FIG. 12. In the arrangement in which the armature coils correspond respectively to the magnet rotors, the terminal ends of an armature coil having a closest relationship to its corresponding magnetic pole with respect to a relationship of any desired armature coil to its corresponding magnetic pole and the terminal ends of that desired armature coil are connected in series with each other so that the armature coils are wound in the same direction. The connected portions are connected via a power supply control circuit 48 in series with positive and negative terminals 51-1, 51-2 of a DC power supply.

More specifically, the joint between a winding starting terminal of the armature coil 47-1 and a winding ending terminal of the armature coil 47-2 is connected to the collectors of transistors 48-1, 48-2 in the power supply control circuit. The joint between a winding ending terminal of the armature coil 47-2 and a winding starting terminal of the armature coil 47-5 is connected to the collectors of transistors 48-3, 48-4. The joint between a winding ending terminal of the armature coil 47-5 and a winding starting terminal of the armature coil 47-6 is connected to the collectors of transistors 48-9, 48-10. The joint between a winding ending terminal of the armature coil 47-6 and a winding starting terminal of the armature coil 47-3 is connected to the collectors of transistors 48-11, 48-12. The joint between a winding ending terminal of the armature coil 47-3 and a winding starting terminal of the armature coil 47-4 is connected to the collectors of transistors 48-5, 48-6. The joint between a winding ending terminal of the armature coil 47-4 and a winding starting terminal of the armature coil 47-1 is connected to the collectors of transistors 48-7, 48-8. The transistors 48-1, 48-3, 48-5, 48-7, 48-9, 48-11 have emitters connected to the positive terminal 51-1 of the DC power supply, and the transistors 48-2, 48-4, 48-6, 48-8, 48-10, 48-12 have emitters connected to the negative terminal 51-2 of the DC power supply. Designated at 49-1, 49-2, ..., 49-6 are position sensors which may comprise Hall effect devices, induction coils, or other devices. The position sensors 49-1 and 49-2, the position sensors 49-3 and 49-4, or the position sensors 49-5 and 49-6 are angularly spaced from each other by 75 degrees (5/3 the magnetic pole width), and the position sensors 49-2 and 49-3, the position sensors 49-4, 49-5, or the position sensors 49-6 and 49-1 are angularly spaced from each other by 45 degrees (the magnetic pole width). The position sensors 49-1, 49-2, ..., 49-6 are housed in the support member 43 in confronting relation to the position sensing indication band 42. Designated at 50 is a position sensing indication band corresponding to the position sensing indication band 42 shown in FIG. 12. Where the position sensors comprise Hall effect devices, the position sensing indication band 50 (shown at 42 in FIG. 12) may be dispensed with to utilize outward leakage fluxes from the magnetic poles 46-1, 46-2, ..., 46-8 of the magnet rotor 46. With such an arrangement, hatched positons 50-1, 50-3, 50-5, 50-7 on the band 50 need to be magnetized as N poles, and stippled portions 50-2, 50-4, 50-6, 50-8 need to be magnetized as S poles, with the hatched and stippled portions having angular intervals of 15 degrees ($\frac{1}{3}$ the magnetic pole width). In order to permit surfaces of the magnetic poles confronting the Hall effect devices to be angularly spaced 15 degrees, other surface portions of the band should be magnetically shielded by magnetic plates as of mild steel. The Hall effect devices may be juxtaposed on the armature 44. As shown by the dotted lines, the Hall effect devices are connected to that they will energize the corresponding transistors in the power supply control circuit 48 when the Hall effect devices confront the N and S poles. When either one of the transistors 48-1, 48-3, 48-5, 48-7, 48-9, 48-11 is energized, a predetermined armature coil is rendered conductive so as to be energized via the positive power supply terminal 51-1. When either one of the transistors 48-2, 48-4, 48-6, 48-8, 48-10, 48-12 is energized, a predetermined armature coil is rendered conductive so as to be energized via the negative power supply terminal 51-2. Thus, an armature current is controlled by conduction of those armature coils. More specifically, with the positional relation as shown, application of a detection output signal from the Hall effect device 49-2 which confronts the N pole energizes the corresponding transistor 48-3, rendering the joint between the armature coils 47-2, 47-5 conductive to the positive power supply terminal 51-1. When a detection output signal from the Hall effect device 49-3 confronting the S pole is applied, the corresponding transistor 48-6 is energized, rendering the joint between the armature coils 47-3, 47-4 conductive to the negative power supply terminal 51-2. Therefore, the armature coils are supplied with currents flowing in the directions of the arrowheads, which produce a torque to thereby rotate the magnet rotor 46 and the position sensing indication band 50 in the directions of the arrows C, D, respectively. Thus, the switching of an armature current is performed 24 ($=mn(2n-2)$) times per revolution, and torques are successively generated. In the case of the semiconductor more, the above-mentioned switching number of an armature current signifies the number when all armature coils are rendered conductive, and the point in which the armature coils are short-circuited is referred to as the singular point, which is excluded from the above-mentioned switching number.

In all the embodiments so far explained, the present invention is applied to the disc-shaped armatures. By its nature, the present invention can be applied to cylindrical armatures and core armatures.

As mentioned previously, the object of the present invention can be achieved by motors provided with a field magnet having $2mn$ magnetic poles, $m(2n\pm2)$ armature coils, and power supply control means capable of performing the switching of an armature current $2mn(2n\pm2)$ times per revolution.

Therefore, in addition to the above-described embodiments, the present invention is applicable to a motor having a field magnet with 14 magnetic poles and 12 or 16 armature coils, or a motor having a field magnet with 16 magnetic poles and 14 or 18 armature coils.

Furthermore, in all the above-described embodiments, $m=1$. However, the present invention is also applicable where the number of magnetic poles of the field magnet and the number of armature coils are each multiplied by m (an integer). With such arrangements, the thickness of the armature remains reduced since the armature coils are in either a single layer or two layers, and hence DC motors are available which are simple in construction, can be massproduced inexpensively, and are of a high torque, high motor efficiency, and better commuting characteristics. All the armatures are theoretically balanced and highly effective for use as rotors.

Thus, there is provided in accordance with the invention a DC electric motor which has the advantages discussed above. The embodiments described are intended to be merely exemplary and those skilled in the art will be able to make variations and modifications in them without departing from the spirit and scope of the inventions. All such modifications and variations are contemplated as falling within the scope of the claims.

What is claimed is:

1. A direct current motor comprising:
   a field magnet having 2mn magnetic poles magnetized with the same angular intervals as those of the magnetic poles N and S, where m is an integer of 1 or more, and n is an integer of 4 or more;
   a magnetic member for closing the magnetic circuit of the magnetic poles of the field magnet;
   an armature in which $m(2n\pm2)$ armature coils are arranged each magnetically with a phase angle of $360/(2n\pm2)$ degrees, the armature being directed towards the magnetic poles in the magnetic circuit;
   electric power supply control means for performing the switching of an armature current $mn(2n\pm2)$ times per revolution of the armature with respect to the field magnet; and
   a rotating shaft for rotatably supporting the armature or the field magnet, said rotating shaft being supported by a bearing disposed in an outer casing of the direct current motor, the terminal of an armature coil which has a closest relationship to its corresponding magnetic pole with respect to a relationship of any desired armature coil to its corresponding magnetic pole, and the terminal of said desired armature coil being connected together to said electric power supply control means so that the armature coils are wound in the same direction in the arrangement in which said armature coils correspond to said magnetic poles.

2. A direct current motor as claimed in claim 1, wherein said electric power supply control means is provided with:
   $mn(2n\pm2)$ commutator segments, which constitute a commutator; and
   short-circuiting means for connecting the terminals of said armature coils to predetermined said commutator segments corresponding to said armature coils, and for short-circuiting every mn commutator segments of said commutator segments, which mn commutator segments are spaced with angular intervals of $360/mn$ degrees, which are half the width of said magnetic poles, said armature coils being capable of being supplied with an electric power from positive and negative terminals of a DC power source via brushes which are movable in sliding contact with said commutator segments, and the angular intervals of said brushes on said commutator segments being equal to the angular intervals of the magnetic pole width, $360/2mn$ degrees, or the angular intervals on the commutator segments which are connected in common with said commutator segments.

3. A direct current motor as claimed in claim 1, wherein said electric power supply control means is provided with:
   $mn(2n\pm2)$ commutator segments, which constitute a commutator;
   a first group of mn brushes which are movable in sliding contact with said commutator segments, with the angular intervals of $360/mn$ degrees, which is half the magnetic pole width of said field magnet; and
   a second group of mn brushes which are movable in sliding contact with said commutator segments, with the angular intervals of $360/2mn$ degrees, which are equal to the magnetic pole width of said field magnet, respectively with respect to said first group of mn brushes, predetermined said commutator segments being connected to terminals of the corresponding armature coils, and said armature coils being capable of being supplied with an electric power via said first and second groups of brushes.

4. A direct current motor as claimed in claim 1, wherein said electric power supply control means comprises:
   position sensors for detecting the rotational position of a rotor; and
   a power supply control circuit for controlling an armature current in accordance with a detection output from said position sensors.

* * * * *